United States Patent [19]
Peterson et al.

[11] Patent Number: 4,860,529
[45] Date of Patent: Aug. 29, 1989

[54] SHAKING MECHANISM FOR FRUIT HARVESTING

[75] Inventors: Donald L. Peterson; Tadeusz Kornecki, both of Martinsburg, W. Va.

[73] Assignee: The United States of America as represented by the Secretary of Agriculture, Washington, D.C.

[21] Appl. No.: 229,877

[22] Filed: Aug. 8, 1988

[51] Int. Cl.⁴ ..................... A01D 46/00; A01D 46/28
[52] U.S. Cl. ..................................... 56/330; 56/328.1
[58] Field of Search .................. 45/330, 328.1, 331, 45/116, 128, DIG. 4; 74/25, 42, 47

[56] References Cited

U.S. PATENT DOCUMENTS

| | | | |
|---|---|---|---|
| 3,225,530 | 12/1965 | Weygandt et al. | 56/330 |
| 3,245,211 | 4/1966 | Weygandt et al. | 56/330 |
| 3,255,578 | 6/1966 | Pertics | 56/330 |
| 3,325,984 | 6/1967 | Christie et al. | 56/330 |
| 3,344,591 | 10/1967 | Christie et al. | 56/330 |
| 3,494,117 | 2/1970 | Weygandt et al. | 56/330 |
| 3,703,072 | 11/1972 | Patzlaff | 56/330 |
| 3,774,381 | 11/1973 | Burton | 56/330 |
| 3,959,959 | 6/1976 | Louault et al. | 56/330 |
| 4,014,160 | 3/1977 | Mecca | 56/330 |
| 4,022,001 | 5/1977 | Burton | 56/330 |
| 4,114,463 | 9/1978 | Garden et al. | 56/330 |
| 4,173,153 | 11/1979 | Klug et al. | 56/DIG. 4 |
| 4,282,706 | 8/1981 | Orlando | 56/330 |
| 4,283,906 | 8/1981 | Scudder | 56/330 |
| 4,769,979 | 9/1988 | Merant | 56/330 |

*Primary Examiner*—Stephen J. Novosad
*Attorney, Agent, or Firm*—M. Howard Silverstein; Mervin E. Brokke; John D. Fado

[57] ABSTRACT

An improved shaking mechanism for small fruits is described. The shaker comprises panels of radially spaced flexible rods which are oscillated by a positive displacement, direct drive that gives more uniform acceleration and displacement along the length of the rods than do conventional inertia and cam-drive shakers. Shaker design is mechanically simple and reliable.

7 Claims, 6 Drawing Sheets

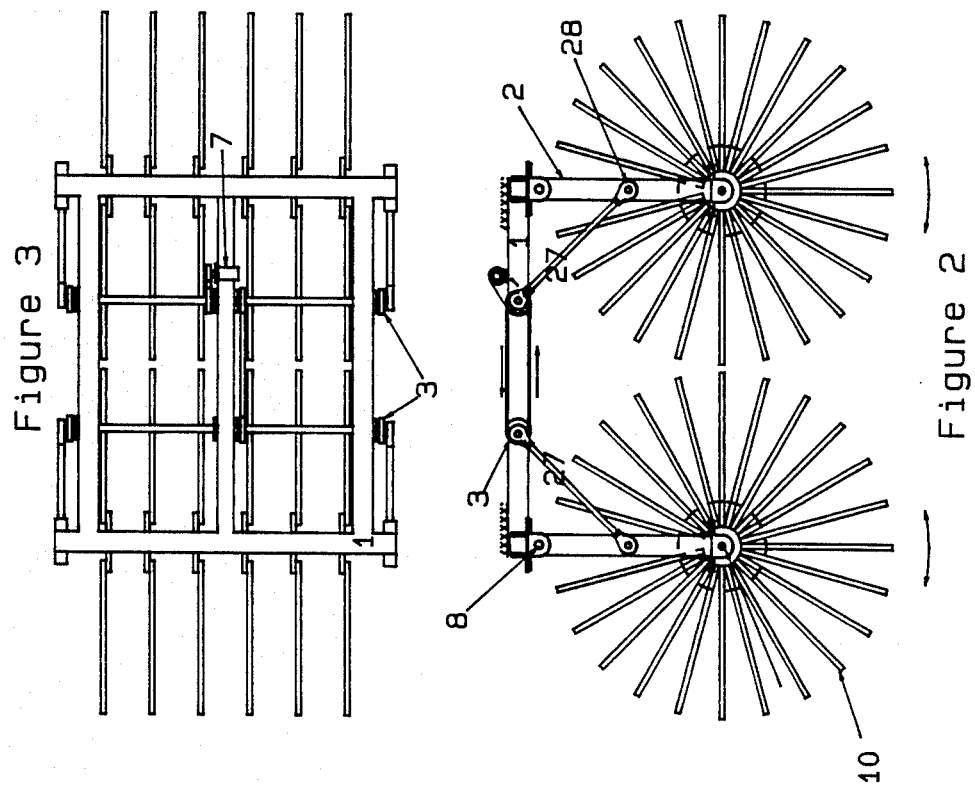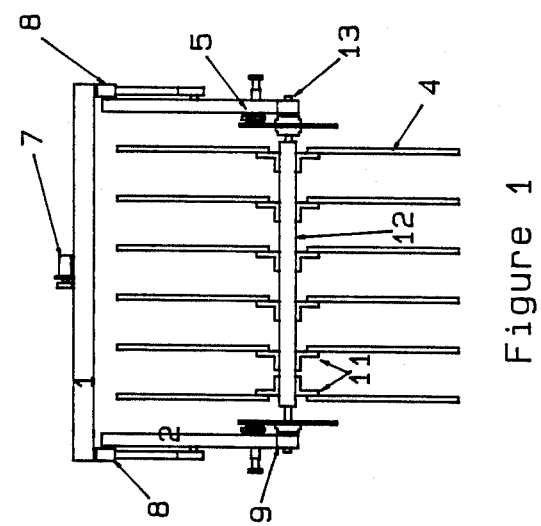

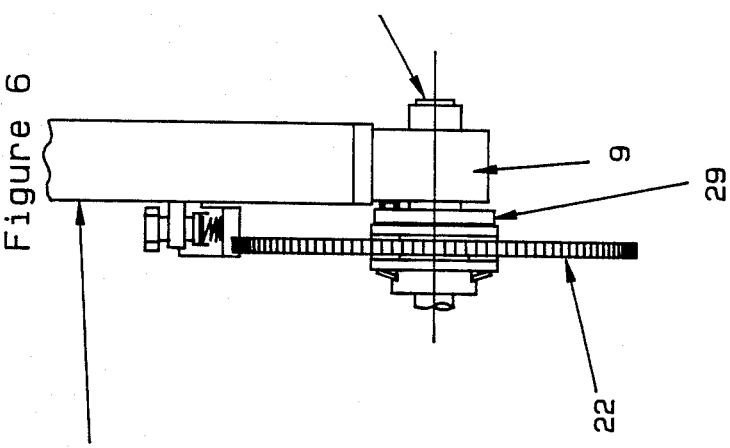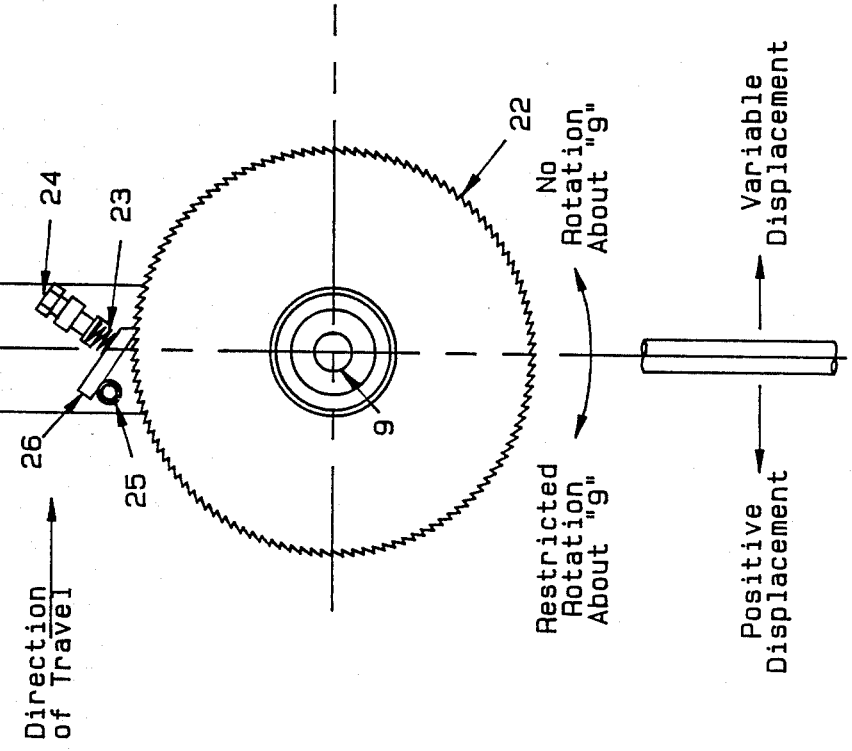

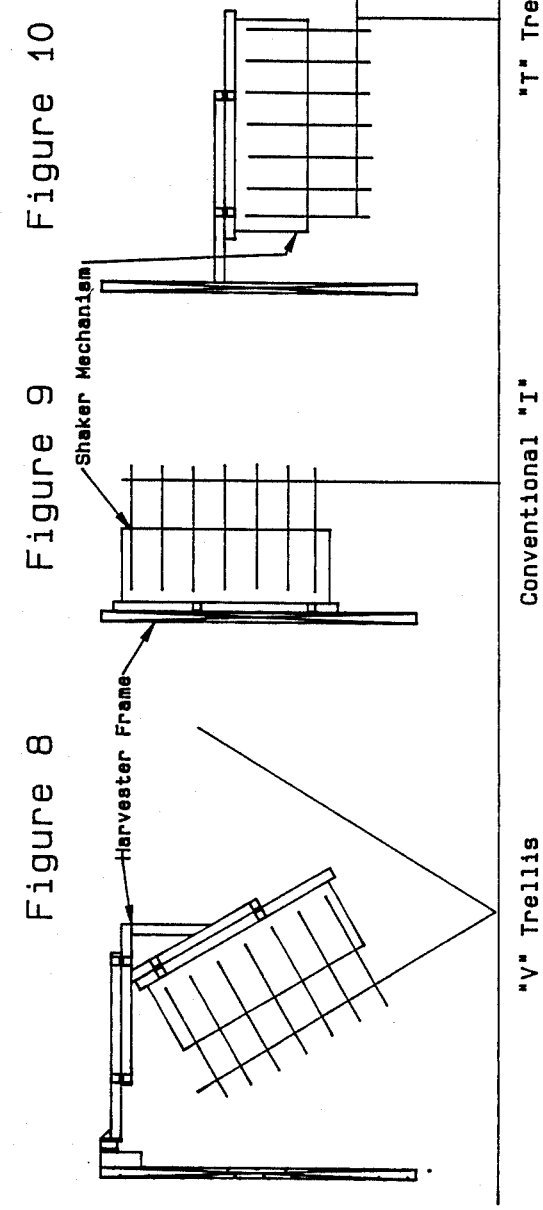

SHAKING MECHANISM FOR FRUIT HARVESTING

BACKGROUND OF THE INVENTION

This invention relates to an improved spiked-drum type fruit harvester.

The high cost of hand harvesting and difficulty of engaging suitable labor at critical times of harvest are serious problems for the fruit grower. The general purpose of this invention is to provide an improved harvesting device that will reduce labor cost and improve the economics and quality of the harvest. This is accomplished by oscillating the spikes or rods of the fruit harvester in a manner to achieve uniform acceleration and displacement to the fruiting canopy, thereby effecting efficient fruit removal. Although designed for brambles, it is envisioned that the improved shaker will have application to other small fruits such as blueberries and grapes.

Among the known types of mechanical harvesters for small fruit the spiked-drum shaker is preferred, because the spikes or rods gently enter the fruiting canopy as the harvester moves along the row. Oscillation of the spikes frees the ripe fruit from the entire canopy with minimal damage to the fruit or vine. The spiked-drum shaker is adaptable to continuous operation of the harvester along the row and to different configurations of the fruiting canopy.

Uniform acceleration of the spikes is a particularly desirable feature of the spiked-drum shaker. This results in uniform displacement of the fruiting canopy, and the force of oscillation may then be adjusted to the minimum amount required to remove the fruit with minimal damage to the vines. Uniformity of shaking action allows for better selectivity in removing mature fruit and leaving immature on the vine.

Heretofore it has not been possible to achieve uniform acceleration of the spikes in the same plane as the rotation of the drum as the harvester moves along the row.

Christie et al., U.S. Pat. No. 3,325,984 (June 20, 1967), describe a spiked-drum shaker oscillated by a directec-centric drive that gives uniform acceleration of the spike but oscillates in a motion perpendicular to the rotation of the drum.

Oscillation in the same plane as the rotation of the drum is provided by Perties with an eccentric cam, U.S. Pat. No. 3,255,578 (June 14, 1966), and by Weygandt et al. with weighted eccentrices, U.S. Pat. No. 3,245,211 (Apr. 12, 1966), but these methods produce substantial differences in acceleration at different points on the spike.

SUMMARY OF THE INVENTION

We have now found that a spiked-drum shaker, designed so that the point of oscillation is located at a distance from the point of rotation, is effective in providing more uniform acceleration along the spikes than previously described shakers.

It is an object of this invention to provide an improved spiked-drum shaker that oscillates in the same plane as the rotation of the drum as the harvester moves along the row, and with substantially uniform acceleration along the spikes.

It is a further object of the invention to provide an improved spiked-drum shaker with means to control the force required to cause rotation of the drum.

It is a further object of this invention to provide a shaker capable of adjustment so that the proper force may be applied to remove substantially all fruit of a predetermined degree of ripeness.

It is a further object of the invention to provide a unique shaking action that effects positive displacement in one direction and variable displacement in the opposite direction.

It is a further object of the invention to provide a mechanical harvester that is mechanically simple, easily maintained, and economically efficient.

Other objects and advantages of this invention will become obvious from examination of the drawings and the ensuing detailed description.

BRIEF DESCRIPTION OF THE DRAWINGS

The various aspects of this invention will be more fully understood when the specification is read in conjunction with the accompanying drawings, wherein:

FIG. 1 is a side view of the improved spiked-drum shaker.

FIG. 2 is an end view of the shaker.

FIG. 3 is a top view of the shaker.

FIGS. 5 and 6 are schematic diagrams of a ratchet to control rotation of the drum.

FIGS. 8, 9, and 10 show application of the new shaker to various trellis configurations.

DETAILED DESCRIPTION OF THE INVENTION

Figure 4:
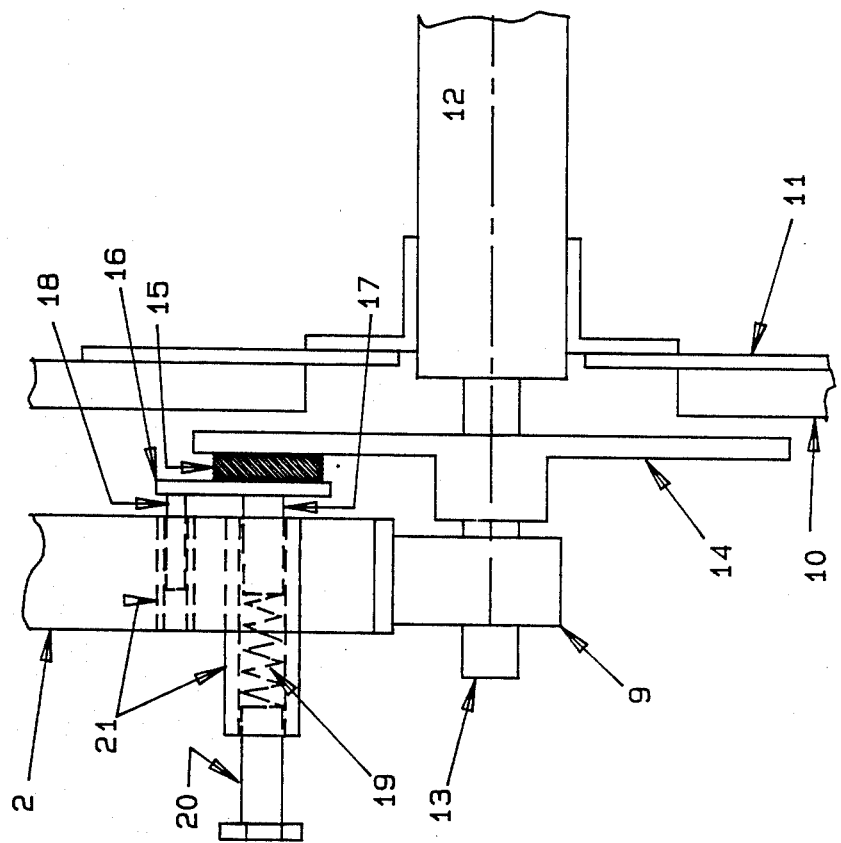
FIG. 4 is a detailed schematic drawing of the friction pad to control rotation of the drum.

This shaker is designed to operate within the framework of a mechanical harvester, which comprises a ground-traversing carriage, means for supporting and powering the shakers, and means mounted beneath the shaker to collect the fruit shaken from the plants. A typical harvester is described by Christie et al. (supra).

The shaker can be easily positioned to accommodate a variety of cultural training practices including the "V" trellis, "T" trellis, and vertical or conventional trellis, as shown in FIGS. 8, 9, and 10. It is anticipated that the spiked-drum shaker would be mounted in a mechanical harvester so that it can be moved continuously along the fruiting canopy while harvesting.

The main components of the preferred configuration of the shaker are illustrated in FIGS. 1, 2, and 3. These comprise a stationary frame 1, oscillating arms 2, a set of eccentric drive means 3, a series of rod or spike panels 4, and a drag or ratchet mechanism 5.

The rigid frame is securely attached to the harvester frame and provides support for a driving means such as a hydraulic motor 7 for the eccentric drive mechanism. The rigid frame also provides support for the oscillating arms by multiple bearings 8 at the oscillating points. The oscillating arms have bearings 9 at the rotating points that support the rod panels and allow them to rotate through the fruiting canopy.

Each rod panel comprises flexible rods or spikes 10 constructed of nylon or other suitable material radially spaced at equal angles and securely fastened to rigid disks 11. Each disk is securely fastened to a rigid tube 12, which has a shaft 13 on each end that is supported by the bearings on the oscillating arms.

The shaker is oscillated by a set of eccentric drives joined by connecting rods 27 to the oscillating arms at pin 28. Power from the hydraulic motor is supplied to the eccentric drives by a conventional drive consisting of chains, sprockets, and drive shafts. Each spiked drum is driven in opposite direction to the other to provide for a balanced shaking action. The frequency of oscillation can be easily controlled by conventional means, such as varying the flow of fluid to the hydraulic motor. The length of shaker stroke can be varied by changing the throw on the crank. It is obvious that optimum frequency of oscillation would vary depending upon the particular fruit to be harvested and the configuration of the fruiting canopy. Oscillation of the shaker of the present invention may be varied from about 2 to 15 hz, with a preferred frequency of about 8 hz.

The details of the drag mechanism are shown in FIG. 4 (drag disk). For each drag mechanism, a smooth drag disk 14 is securely fastened to the rod support shaft 13. A friction pad 15 affixed to a pad support plate 16, which is positioned by the pad support rod 17 and guide rod 18, is pressed against the drag disk to create friction to resist rotation of the rods.

The force generated to resist rotation is adjustable by means of a spring 19 and force-adjusting bolt 20 operating in support tubes 21.

Force on the friction pad is set so that oscillation of the rods transmits sufficient energy to the vines or canes to remove fruit but allows rotation of the rods through the fruiting canopy as the harvester moves continuously along the row.

If the force to remove the fruit exceeds the force that allows the rods to freely rotate through the canopy, a ratchet mechanism illustrated in FIGS. 5 and 6 is an alternative to the drag mechanism. As shown, the ratchet wheel 22 is mounted on the rod support shaft and allows clockwise rotation around point 9 as the harvester moves forward.

No counterclockwise rotation is allowed around point 9. Force to hold the ratchet wheel is applied by a force-adjusting bolt 24 acting upon the ratchet spring 23 and pawl 26, which rests upon a pivot 25.

Since the rotation point is between the oscillating point and the tips of the rod, rearward movement of the oscillating frame will cause a positive displacement of the rods because of the restricted rotation about point 9. Movement in the forward direction will cause a variable displacement of the rods, depending on the force of the ratchet spring against the pawl. The greater the force on the panel, the greater is the force imparted by the rods in the forward direction; but there is more resistance to rotation of the rods through the fruiting canopy.

A clutch 29 is used to support the ratchet wheel on the rod support shaft and acts as a safety device during the positive displacement of the rods. The clutch is set at a force/slip level high enough to transmit sufficient energy for fruit removal, but it prevents damage if the rods engage a rigid object such as a trellis support member.

Figure 7:
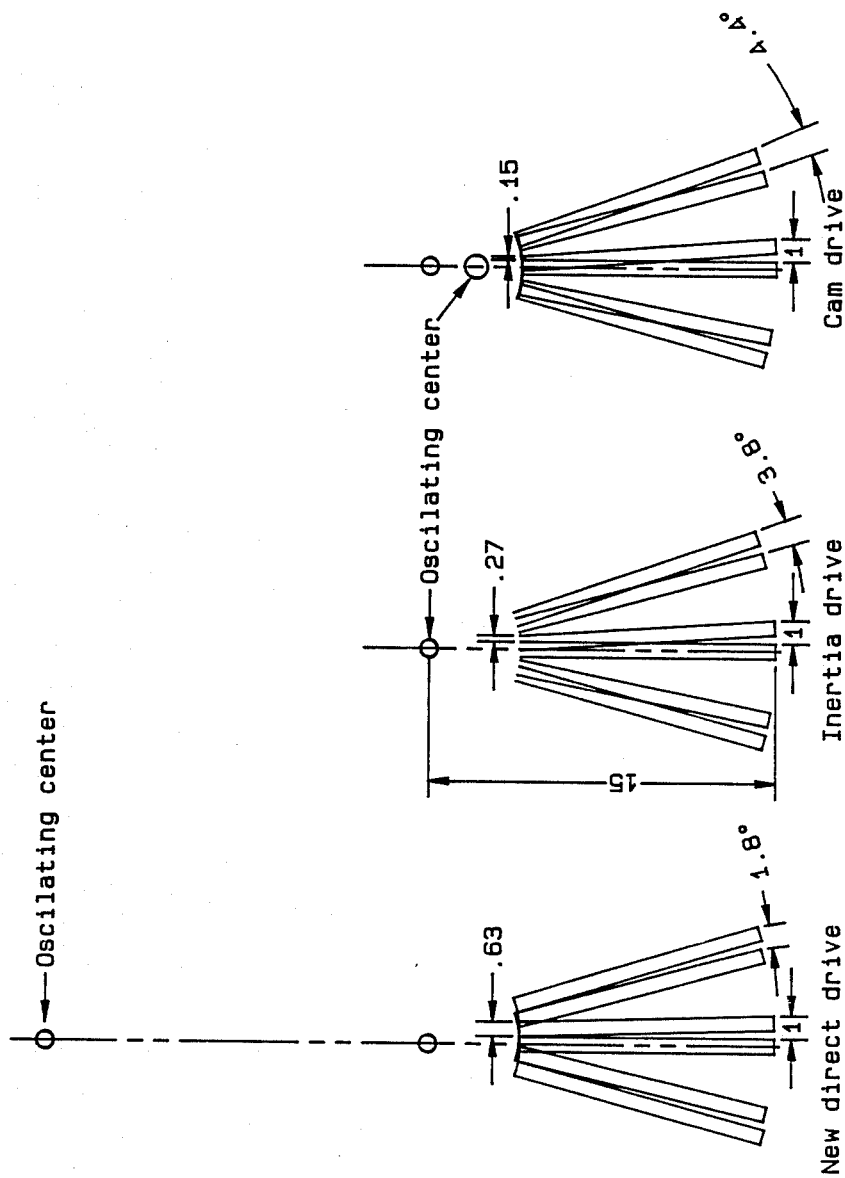
FIG. 7 shows a schematic diagram of the displacement or acceleration of the spikes in the improved shaker compared to the inertia drive and cam drive shaker.

As illustrated in FIG. 7, this invention imparts shaking forces and accelerations parallel along the row with a direct eccentric drive. The displacement and acceleration of the shaking rods are more uniform than with inertia or cam-drive on conventional spiked-drum shakers. As an example, comparing the displacement of rods on a 30" diameter spiked wheel, a 1" displacement of the rod at the tip yields 0.63", 0.27", and 0.15" at 11" from the tip for the direct drive, inertia drive, and cam drive, respectively. This action allows the direct drive shaker to transfer more uniform force and acceleration to the fruiting canopy than do the inertia or cam-driven shakers. The direct eccentric drive shaker has fewer moving parts than either the inertia or cam-driven shaker.

Figure 12:
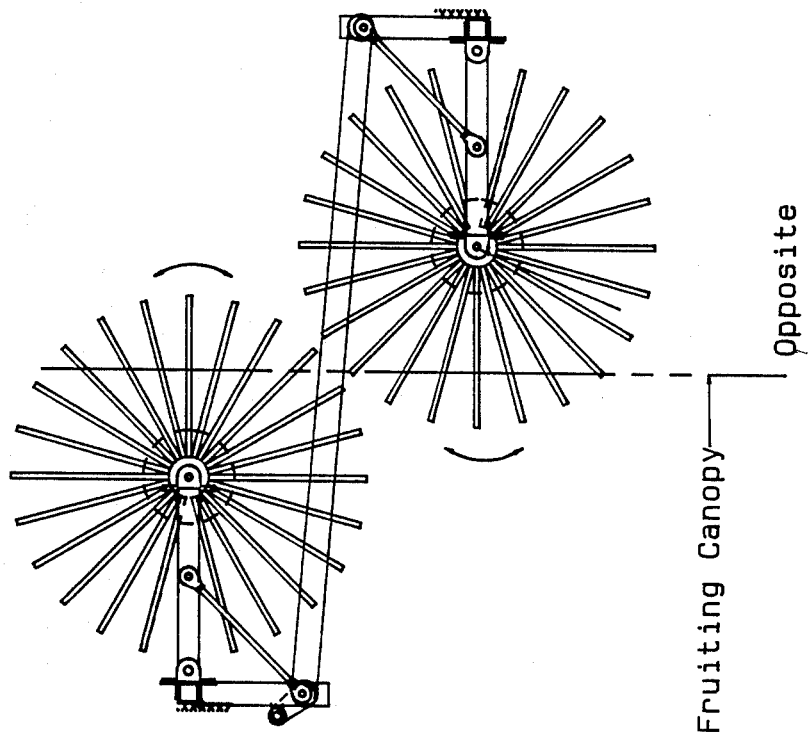
FIG. 12 shows a multiple drum diagonally opposite configuration.
Figure 11:
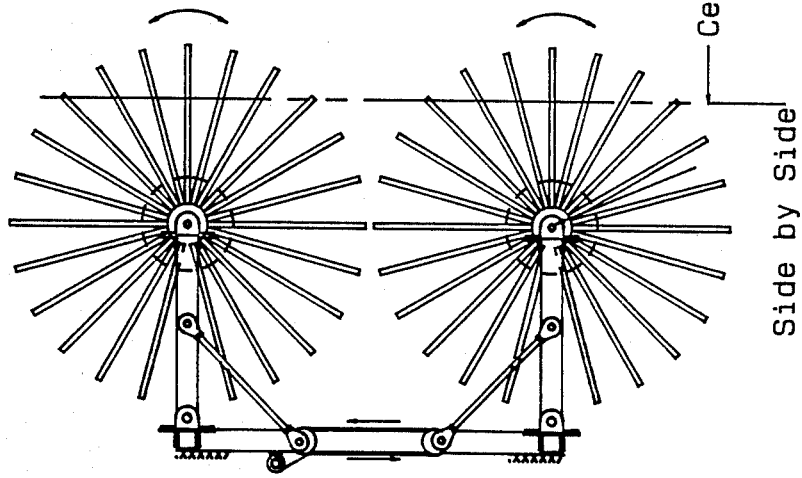
FIG. 11 shows a multiple drum side by side configuration, which is the preferred embodiment of the invention.

It is desirable to mount multiple drums on a mechanical harvester to increase efficiency in fruit removal and to minimize vibration of the harvester frame. Other drive mechanisms will also be obvious to those skilled in this area. FIGS. 11 and 12 illustrate examples of different arrangements of drums and drive mechanisms. The preferred configuration is shown in FIG. 11, since this configuration permits it to be easily adapted to a variety of trellis systems.

It is apparent that as a harvester equipped with spiked drum shakers traverses a canopy, preferably straddling the fruiting vines or canes, the rods or spikes will contact each bush at the side thereof. The spiked drum is not rotated by direct means and may either rotate with the movement of the harvester or be held against rotation. The rods may be swung by the branches so as to project into the canopy. This results in minimum injury to the branches but allows the rods to contact each branch. The oscillating motion of the rods is thereby transferred to substantial portions of the canopy at different elevations. This permits shaking of all portions of the canopy and efficient removal of the fruit therefrom, and collection by a collector means located under the spiked-drum shaker.

In many canopy configurations, particularly with brambles, it is desirable to shake in a horizontal direction or opposite to the principal orientation of the vines. This may be accomplished with the direct eccentric drive shaker described in this invention.

While the preferred embodiment of this invention has been illustrated, it is understood that changes in construction and configuration may be made without departing from the spirit of the invention, which is defined by the claims.

We claim:

1. An improved spiked-drum fruit harvester comprising: a ground-traversing carriage; one or more spiked-drum shakers; means attached to said carriage for supporting and powering said shaker; collecting means supported by said carriage below said shaker designed to collect fruit removed by said shaker; wherein the improvement comprises: an oscillating means capable of oscillating said spiked drum or drums in a motion parallel with the plane of rotation of said drum and with substantially uniform acceleration of the spikes; said oscillating means comprising an eccentric drive means mounted on a stationary frame, said eccentric drive being operationally connected to an oscillating arm or arms, said oscillating arm or arms being movably connected to said stationary frame and rotatably supporting said spiked drum.

2. An improved spiked-drum fruit harvester comprising: a ground-traversing carriage; one or more spiked-drum shakers; means attached to said carriage for supporting and powering said shakers; collecting means supported by said carriage below said shaker designed to collect fruit removed by said shaker; wherein the improvement comprises: adjustable control means to vary the force required to rotate said spiked-drum shaker.

3. An improved spiked-drum fruit harvester as defined in claim 2, wherein said adjustable control means comprises a friction pad and drag disk.

4. An improved spiked-drum fruit harvester as defined in claim 2, wherein said adjustable control means comprises a ratchet.

5. An improved spiked-drum fruit harvester comprising: a ground-traversing carriage; one or more spiked-drum shakers; means attached to said carriage for supporting and powering said shakers; collecting means supported by said carriage below said shaker designed to collect fruit removed by said shaker; wherein the improvement comprises: an oscillating means capable of oscillating said spiked drum in a motion parallel with the plane of rotation of said drum and with substantially uniform acceleration of the spikes; and adjustable control means to vary the force required to rotate said spiked-drum shaker.

6. An improved spiked-drum fruit harvester as defined in claim 5, wherein said oscillating means comprises an eccentric drive means mounted on a stationary frame, said eccentric drive being operatively connected to an oscillating arm or arms, said oscillating arm or arms being movably connected to said stationary frame and rotatably supporting said spiked drum; and wherein said adjustable control means comprises a friction pad and drag disk.

7. An improved spiked-drum fruit harvester as defined in claim 5, wherein said oscillating means comprises an eccentric drive means mounted on a stationary frame, said eccentric drive being operatively connected to an oscillating arm or arms, said oscillating arm or arms being movably connected to said stationary frame and rotatably supporting said spiked drum; and wherein said adjustable control means comprises a ratchet.

* * * * *